United States Patent
Nimmergut

(10) Patent No.: US 8,851,880 B2
(45) Date of Patent: Oct. 7, 2014

(54) POWDER SLUSH MOLDING PROCESS AND EQUIPMENT

(75) Inventor: Edgar P. Nimmergut, White Lake, MI (US)

(73) Assignee: Faurecia Interior Systems, Inc., Auburn Hills, MI (US)

(*) Notice: Subject to any disclaimer, the term of this patent is extended or adjusted under 35 U.S.C. 154(b) by 589 days.

(21) Appl. No.: 12/830,504

(22) Filed: Jul. 6, 2010

(65) Prior Publication Data

US 2012/0007281 A1 Jan. 12, 2012

(51) Int. Cl.
*B29C 41/18* (2006.01)
*B28B 1/20* (2006.01)

(52) U.S. Cl.
USPC ........... 425/435; 425/296; 425/308; 425/110; 264/302

(58) Field of Classification Search
USPC .......................................... 425/435; 264/302
See application file for complete search history.

(56) References Cited

U.S. PATENT DOCUMENTS

| | | | |
|---|---|---|---|
| 5,407,631 A | 4/1995 | Salisbury | |
| 5,849,341 A | 12/1998 | Johno et al. | |
| 5,932,162 A * | 8/1999 | Johno | 264/302 |
| 6,589,470 B2 * | 7/2003 | Fried et al. | 264/443 |
| 2001/0020757 A1 * | 9/2001 | Fried et al. | 264/443 |

FOREIGN PATENT DOCUMENTS

| | | | |
|---|---|---|---|
| DE | 10157394 | | 6/2003 |
| GB | 1223073 | | 2/1971 |
| JP | H0650814 | | 7/1994 |
| JP | H0650815 | | 7/1994 |
| JP | H072022 | | 1/1995 |
| JP | 10095022 | | 4/1998 |
| JP | 095022 | * | 10/1998 |
| JP | 11192634 | | 7/1999 |
| JP | 2006256068 | | 9/2006 |

OTHER PUBLICATIONS

Machine Translation of Japanese Publication (JP07-2022 (U)) (abstract and Japanese Publication submitted with IDS)).*
Machine translation of JP10095022.*
Machine translation of JP 07-002022 (1995).*
Machine translation of JP 10-095022 (1998).*
Sandip Patel, Norm Kakarala and Tom Ellis, "Development of a Slush Molded TPO Instrument Panel Skin", 20054-01-1224, 2005 SAE World Congress, 6 pages.
EP Search Report for application EP 11 17 1841, Nov. 28, 2011, 2 pages.

* cited by examiner

*Primary Examiner* — Robert J Grun
(74) *Attorney, Agent, or Firm* — Reising Ethington P.C.

(57) ABSTRACT

A powder slush molding process and associated equipment utilize a flow restrictor disposed between a powder box and a mold surface to deposit powdered resin onto the mold surface in a controlled manner, thereby forming skins having decreased variation in thickness.

16 Claims, 2 Drawing Sheets

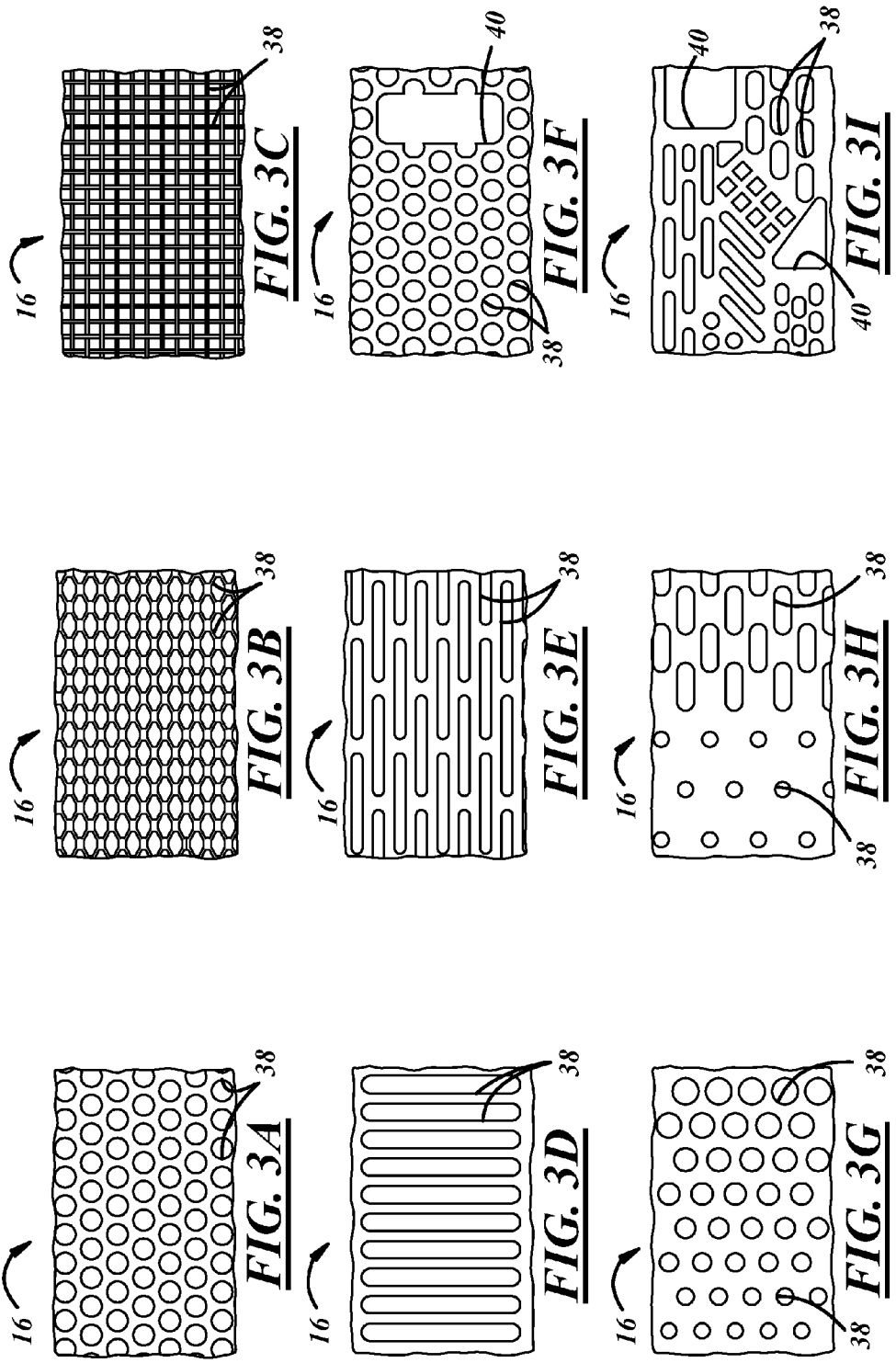

US 8,851,880 B2

POWDER SLUSH MOLDING PROCESS AND EQUIPMENT

TECHNICAL FIELD

The present disclosure relates generally to powder molding processes and related equipment.

BACKGROUND OF THE INVENTION

Powder slush molding processes can be used to form polymer-based skins that are useful as decorative coverings in automobile interiors or other applications. For example, such decorative coverings can be used on interior door panels and instrument panels in automobiles. In some applications, it can be desirable to minimize variation in or otherwise control the thickness of the skin.

SUMMARY OF THE INVENTION

According to one aspect of the invention, there is provided a powder slush molding tool that includes a mold having a mold surface, a powder box having an open end, and a grate having one or more openings. The open end of the powder box permits flow of powdered resin from the powder box to the mold surface when the powder box and mold are connected together. The grate extends at least partially across the open end and restricts the flow of powdered resin through the open end.

In accordance with another aspect of the invention, there is provided a method of powder slush molding. The method includes the steps of providing a molding tool having a mold surface and having a powder box at least partially filled with a powdered resin, and depositing at least some of the powdered resin onto the mold surface through a flow restrictor that extends at least partially across an open end of the powder box.

In accordance with another aspect of the invention, there is provided a method of powder slush molding. The method includes the steps of: providing a molding tool that includes a powder box containing a powdered resin and a mold having a mold surface; heating the mold surface to a level sufficient to melt the powdered resin; attaching the mold to the powder box so that the molding tool is in a starting orientation with the mold surface above the powder box and opposing an open end of the powder box; rotating the molding tool about an axis so that the molding tool is inverted during the rotating and so that the molding tool returns to the starting orientation; depositing at least some of the powdered resin onto the mold surface while restricting the free flow of the powdered resin from the powder box to the mold surface during the rotating step so that powdered resin is deposited onto the mold surface in a controlled manner; melting the powdered resin that is deposited onto the mold surface to form a molten layer of resin; and solidifying the molten layer of resin to form a skin.

BRIEF DESCRIPTION OF THE DRAWINGS

One or more preferred exemplary embodiments of the invention will hereinafter be described in conjunction with the appended drawings, wherein like designations denote like elements, and wherein:

FIGS. 3A-3I are plan views of portions of exemplary grates showing various arrangements of openings.

DETAILED DESCRIPTION OF THE PREFERRED EMBODIMENT(S)

Powder slush molding generally includes depositing powdered resin onto a heated mold surface of a mold so that the resin melts when it comes into contact with the heated mold surface. Excess powder that is far enough from the mold surface to remain in powder form can then be removed from the mold for use in a subsequent molding cycle, while a layer of molten resin remains on the mold surface. The layer of molten resin can then be solidified to form a skin.

Figure 1:
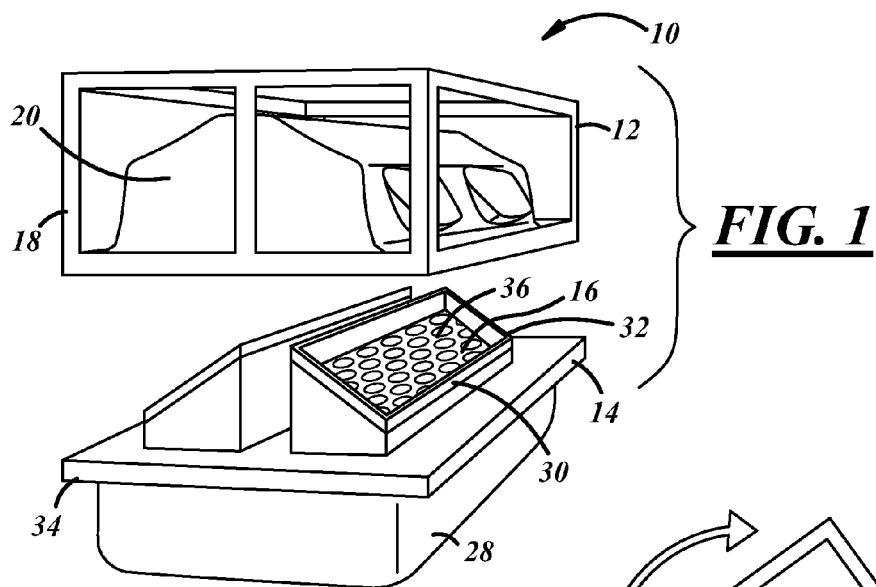
FIG. 1 is a perspective view of an exemplary powder slush molding tool according to one embodiment.

Referring to FIGS. 1 and 2, a powder slush molding tool 10 is shown according to an exemplary embodiment. The molding tool 10 includes a mold 12, a powder box 14, and a flow restrictor 16. In this embodiment, mold 12 includes a frame 18, a shell 20, temperature control lines 22, and fence 24. The frame 18 is a structure provided to support the shell 20 and various other components such as temperature control lines, control line connectors, attachment points for a rotating shaft for turning the molding tool, etc. The frame 18 can also provide a structure to attach or connect the mold 12 to the powder box 14.

In the illustrated embodiment, shell 20 is a structure having a generally uniform wall thickness and includes a mold surface 26. The mold surface 26 includes a contour that is formed in the desired final contour of the skin. The shell 20 is formed from a material having sufficient strength and thermal conductivity so that it can be heated and cooled rapidly and is preferably a metallic material such as nickel, a nickel-based alloy, or another material that includes a plated layer of nickel on the mold surface side of the shell. Materials not including nickel or nickel layers may also be used. Mold surface 26 can be a smooth surface, or it can be textured so that a skin formed thereon will include a matching textured surface when removed from the mold surface 26. As shown in the cross-sections of FIG. 2, the mold can include more than one mold surface 26; e.g., two mold surfaces 26 are shown in FIG. 2.

Temperature control lines 22 are shown in cross-section in FIG. 2 and are conduits that can facilitate the flow of a fluid for heating and/or cooling. In this embodiment, the lines 22 are positioned adjacent the surface of the shell 20 that opposes the mold surface 26 through the wall thickness of the shell, and they extend longitudinally to reach all of the regions of the shell that require heating and/or cooling. The lines 22 can be a plurality of discrete lines, each having its own temperature control, or they can be a single line in a serpentine arrangement running back and forth along the shell and ultimately attached to a single temperature controller. Or the lines 22 can be divided into any number of separate temperature control regions, each region having its own temperature control. The lines 22 are preferably formed from thermally conductive materials to efficiently transfer thermal energy between the shell 20 and the fluid or fluids contained within the lines. The heating and/or cooling fluid can include oil, water, or some other fluid, and not all lines 22 necessarily include the same temperature control fluid. Of course this is only one example of temperature control lines. For example, temperature control lines 22 could be formed as conduits completely contained within the shell 20 or could be arranged to run in a different direction than that shown in the figures. Skilled artisans will also appreciate that providing a shell 20 and temperature control lines 22 is only one of many ways to provide a mold surface 26 that can be heated and/or cooled. For instance, shell 20 can be heated and cooled using a variety of methods such as hot air heating, infrared heating, fluidized bed heating, induction heating, and/or cooling with cold air or other cooling fluids in direct or indirect contact with a surface of shell 20. Alternatively, mold surface 26 can be provided as a surface formed on a solid piece of material similar to a mold surface used in a mold for plastic injection molding, rather than a shell. But the reduced mass of shell 20 compared to a solid piece of material can allow relatively faster heating and cooling of mold surface 26.

Fence 24 is an optional component included with mold 12 to surround or circumscribe the desired portions of the mold surface side of shell 20 to help define mold surface 26 and so that powdered resin is conserved. The fence 24, shown in FIG. 2, can prevent powdered resin from reaching portions of the mold surface side of the shell 20 that are not part of the mold surface 26; i.e., some portions of the mold surface side of the shell 20 are included to allow the shell to be continuous and are not used to help form the skin. The fence 24 can also provide a surface against which the powder box 14 can seal.

Powder box 14 is a container for holding powdered resin (depicted as P in FIG. 2A) before, during, and/or after the powder slush molding process. Powder box 14 may include a powder reservoir 28, an open end 30, a seal 32, and a flange 34. Powder reservoir 28 is generally a storage area for powdered resin when powder box 14 is in the orientation shown in FIG. 2A. During a slush molding process, powdered resin can be transferred to and from the powder reservoir 28 through open end 30.

Open end 30 broadly includes an end of powder box 14 through which powdered resin can flow to and from mold 12 during the slush molding process. As depicted in the embodiment in the figures, open end 30 can be in the form of one or more chutes that extend toward the mold 12 when powder box 14 and mold 12 are connected together, but can also be in any variety of shapes, including a simple two-dimensional opening in an otherwise continuous surface or more than one of such openings. Powder box 14 may include, for example, a powder reservoir 28 in the form of a box with no top, in which case the open end 30 is defined by the area where the top would be if the box was closed-off.

Seal 32 is an element that can be disposed between the mold 12 and powder box 14 to prevent powdered resin from escaping from the molding tool 10 during the slush molding process. In this embodiment, seal 32 is attached to powder box 14 and is located at an outer periphery that circumscribes each chute of open end 30. The seal 32 can be formed from an elastomeric material having sufficient sealing properties such as, for example, silicone rubber, polyurethane-based elastomers, rubber-based materials, thermoplastic elastomers, or other polymeric or non-polymeric materials. Seal 32 could be attached to mold 12, or more specifically to fence 24 where included, or it could be an entirely separate component attached to neither the mold 12 nor powder box 14. It could also be omitted entirely in embodiments in which sufficient sealing surfaces are formed on mating surfaces of mold 12 and powder box 14.

Flange 34 is a structure provided to attach or connect the mold 12 to the powder box 14, among other uses. The flange 34 can be formed integral with the powder reservoir 28, or it can be a frame-like component to which other powder box components can be attached. It is an optional component of powder box 14, as other means can be used to connect the mold 12 to the powder box.

Flow restrictor 16 is an element for restricting flow of powdered resin from powder box 14 to mold 12 during the slush molding process. One embodiment of a flow restrictor includes a grate, as shown in FIGS. 1-3. Grate 16 generally includes one or more openings 36 through which powdered resin can flow and is configured to extend at least partially across open end 30 of powder box 14 of molding tool 10. As will be further discussed below, a variety of types, shapes, and arrangements of openings 36 is possible, but any opening 36 is smaller in projected area than the open end 30 such that the opening 36 will restrict the free flow of powdered resin through the open end 30. In the embodiment of the molding tool 10 shown in FIGS. 1 and 2, the grate 16 extends across substantially the entire open end 30 and is attached to powder box 14. More specifically, grate 16 is disposed within the open end 30, which includes a pair of chutes in this example. The grate 16 may be attached to powder box 14 such that at least a portion of its margins have substantially the same contour as at least a portion of the outer periphery of the powder box that circumscribes the open end 30. The examples in FIGS. 1 and 2 include such an arrangement in that the grate 16 is generally planar in contour, and the plane in which the grate lies is generally parallel to the plane in which the outer periphery lies (in this case, generally the same as the plane in which seal 32 lies). The contour of one or more portions of the outer periphery and/or the grate 16 can be shaped such that the contour is at least in the same general direction as the contour of mold surface 26, thereby minimizing the variation in distance from grate 16 to mold surface 26. In some embodiments, grate 16 may only extend partially across open end 30. The flow restrictor 16 may alternatively be attached to the mold 12 or may be a separate element altogether and attached to neither the mold 12 nor the powder box 14 and disposed between the two components temporarily during the slush molding process. Flow restrictor 16 is not limited to grates. It may be any element that has the effect of restricting the flow of powdered resin from powder box 14 to mold 12 or to mold surface 26, such as a series of funnels or other three-dimensional shapes or other types of restrictors that do not use physical barriers or mechanical restriction and instead use other methods of flow restriction, such as controlled air pressure. Flow restrictors may also or alternatively use electrical, electrostatic, magnetic, or other properties of the powdered resin to restrict its flow.

Referring now to FIGS. 3A-3I, several different embodiments of portions of grates 16 are shown including different types, shapes, and arrangements of openings 36. Openings 36 may be of at least two types, including apertures 38 and cut-outs 40. As used herein, a cut-out 40 is an opening that is larger in projected area than any aperture 38 included in the same grate 16. A cut-out 40 has a projected area at least 4 times that of any other opening in the same grate, excluding other cut-outs. Every opening that is not a cut-out is referred to as an aperture 38. Some examples of grates having both apertures 38 and cut-outs 40 will be described below.

In the embodiment of FIG. 3A, the openings of grate 16 include a plurality of apertures 38. The apertures 38 in this example are arranged in a pattern. Each aperture 38 is circular in shape and the distance from the center of any one aperture to the center of another adjacent aperture is equal for all apertures. Each aperture 38 in this example has the same diameter or width. This type of pattern may be commonly found in commercially available perforated stainless steel plate, but other materials may of course be used to form the grate. This or other exemplary grates may be formed such that opposing faces of the grate are smooth; i.e., the grate 16 does not include any appreciable standing features, such as burrs around the apertures or any other raised features. Smooth grate faces can allow powdered resin to move freely from one end of the grate to the other, as will be described in more detail below.

In the embodiment of FIG. 3B, the openings of grate 16 also include a plurality of apertures 38 arranged in a pattern. In this example, each aperture 38 is generally diamond-shaped and has the same dimensions. This type of pattern may be commonly found in commercially available expanded metal products.

In the embodiment of FIG. 3C, the openings of grate 16 again include a plurality of apertures 38 arranged in a pattern. In this example, each aperture 38 is generally square-shaped and has the same dimensions. This type of pattern may be commonly found in commercially available wire mesh products in which strands of metal wire are interwoven with one another in a grid pattern.

In the embodiment of FIG. 3D, the openings of grate 16 include a plurality of apertures 38 arranged in a pattern. In this example, each aperture 38 is elongated in shape or slot-shaped, each aperture 38 having a length greater than its width. The apertures are arranged side-by-side with the length-wise ends of each aperture 38 aligned with one another.

In the embodiment of FIG. 3E, the openings of grate 16 include a plurality of apertures 38 arranged in a pattern. In this example, each aperture 38 is elongated in shape or slot-shaped, each aperture 38 having a length greater than its width. The apertures are arranged end-to-end in side-by-side rows, and the length-wise ends of each aperture 38 are aligned with the length-wise ends of apertures in alternating rows.

In the embodiment of FIG. 3F, the openings of grate 16 include a plurality of apertures 38 arranged in a pattern the same as the pattern of the apertures in FIG. 3A. The grate 16 in this example also includes a cut-out 40 that is elongated or slot-shaped. Whereas grates having only patterned apertures 38, such as the grates in FIGS. 3A-3E, theoretically allow a uniform flow of powdered resin through them over the entire grate area, the grate of FIG. 3F including cut-out 40 allows an increased flow of powdered resin (relative to the flow through the apertures) through the grate in the region that includes the cut-out. This can be useful in slush molding processes that would otherwise produce skins having thin areas; i.e., the cut-out can allow additional powdered resin to be deposited onto the mold surface in desired locations corresponding generally to the location of the cut-out.

In the embodiment of FIG. 3G, the openings of grate 16 include a plurality of apertures 38. The apertures 38 in this example are arranged in a pattern. Each aperture 38 is circular in shape. As is apparent from the figure, some of the apertures 38 in this example have different diameters or widths than some of the other apertures. More particularly, the aperture sizes in this exemplary grate include an increasing gradient from the left side of the grate to the right side of the grate (as oriented in the figure). This type of arrangement of grate openings can be useful in applications in which a variation in powdered resin flow is desired along the length or width of the grate. The variation in this case would theoretically include a gradual increase or decrease in flow along the length or width of the grate.

In the embodiment of FIG. 3H, the openings of grate 16 include a plurality of apertures 38. The apertures in this example are arranged in at least two patterns. One pattern includes circular apertures in one portion of the grate, and another pattern includes elongated apertures in another portion of the grate. This type of arrangement of grate openings can also be useful in applications in which a variation in powdered resin flow is desired along the length or width of the grate. The variation in this case would theoretically include a more step-like increase or decrease in flow along the length or width of the grate, as opposed to the gradual one described in connection with FIG. 3G. This type of arrangement of openings may also be useful where increased flow of powdered resin is desired through a particular portion of the grate, but where a cut-out having the required size would compromise the structural integrity of the grate or otherwise be undesirable.

In the embodiment of FIG. 3I, the openings of grate 16 include a plurality of apertures 38 having a plurality of sizes that are not arranged in any particular pattern. The openings also include exemplary cut-outs 40. This example demonstrates the completely customizable nature of grate 16. The openings can be sized and arranged in a limitless number of ways to achieve the desired flow and restriction characteristics for the grate such that the desired amount of powdered resin can be allowed to flow from powder box 14 to the appropriate portions of mold surface 26 during the slush molding process. Skilled artisans will appreciate that while grate 16 may preferably be formed from metal materials, it may be formed from any material or combination of materials.

Grate 16 can be further characterized by an openness percentage and/or by the sizes of openings 36. The openness percentage of a particular portion of a grate can be calculated by first determining the actual surface area of one face of the portion of the grate in question. A second determination of the surface area of the same face of the same portion is then made, this time as if there are no openings in it. The difference represents the open area in that portion of the grate, and the openness percentage is the difference divided by the result of the second determination and multiplied by 100. For example, if a portion of a solid sheet of material has a surface area of 3 $in^2$, and a 1 $in^2$ opening is then formed therethrough, leaving behind 2 $in^2$ of actual grate surface area, the openness percentage of that portion of the resulting grate is 33%. In one embodiment, grate 16 includes a plurality of openings arranged in a pattern in at least a portion of the grate, and that portion of the grate has an openness percentage from about 30% to about 65%, and preferably about 40%. This same range and preference for the openness ratio may be applicable to the entire grate 16 as well, exclusive of portions having cut-outs. Grate openings 36 may range in size from about 5 mm to about 15 mm in width or diameter, and preferably have an average size of about 10 mm. In one embodiment, the grate 16 includes a plurality of circular apertures 38 formed therethrough and arranged in a pattern, each aperture having a diameter of about 10 mm, such that the openness percentage across the entire grate is about 40%. Of course, skilled artisans will appreciate that openness percentages outside the above range, as well as opening sizes outside the above range, may be used.

An exemplary method of powder slush molding can best be described with reference to FIGS. 2A-2D. The method includes providing a powder box 14 having an open end 30, as described above, that is at least partially filled with powdered resin (depicted as P in FIG. 2A). The powdered resin can be any one of a variety of powdered resins, but is generally a polymer-based resin. Some exemplary polymer-based resins include resins comprising polyvinylchloride (PVC), thermoplastic urethanes (TPU), thermoplastic olefins (TPO), and/or thermoplastic elastomers (TPE), to name a few. Of course, any polymer-based material that can be produced in powdered form may be used in this exemplary process. Amorphous thermoplastic materials are preferred for their broad softening and melting ranges, but semi-crystalline thermoplastic materials such as TPOs or others may be used. Additionally, it is possible to use thermosetting polymer-based materials that soften or melt with increased temperature then cross-link with additional exposure to elevated temperatures. The method further includes providing a mold 12, such as one described above, having a mold surface 26. The mold surface 26 can be heated to a temperature that is sufficient to melt the particular powdered resin, generally at or above the melting or softening point of the resin or of the component of the resin having the highest melting point. The heating can be accomplished in a variety of ways as previously described. In the embodiment of FIG. 2, it is accomplished by flowing a fluid that is at a temperature at or above the desired mold surface temperature through one or more of the temperature control lines 22. A flow restrictor 16 is also provided that extends at least partially across open end 30 of the powder box 14. In this embodiment, the flow restrictor includes a grate that is disposed within and attached to open end 30. With the open end 30 of powder box 14 facing in an upward direction, the mold 12 can be securely connected to the powder box with mold surface 26 facing in a downward direction, above and opposing open end 30 of the powder box. The secure connection between powder box 14 and mold 12 can be formed by any suitable means such as mechanical, electrical, or fluid powered clamps, by disposing pins or dowels in aligned apertures of the respective frame components of the powder box 14 and mold 12, or by other means.

Figure 2A:
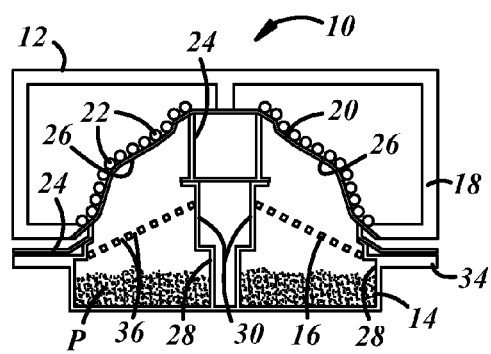
FIGS. 2A-2D are sequential schematic cross-sectional views of an exemplary powder slush molding tool during a slush molding process.
Figure 2B:
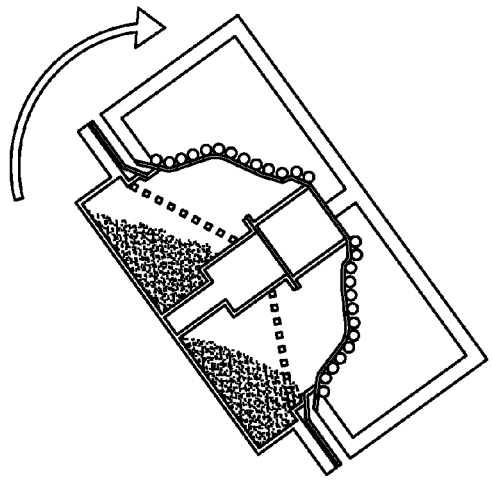
Figure 2C:
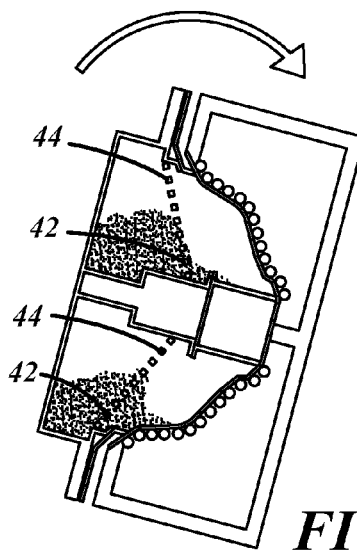
Figure 2D:
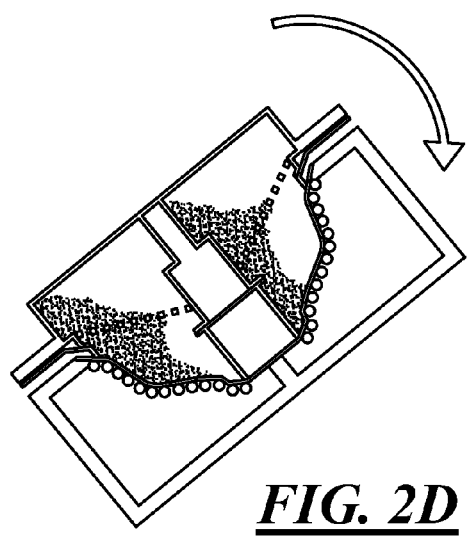

Molding tool 10 has a starting orientation, as shown in FIG. 2A, and can progress through other orientations as shown in FIGS. 2B-2D. The other orientations progressively cause at least some of the powdered resin to be deposited onto the mold surface 26 through flow restrictor 16. In this exemplary method, molding tool 10 is rotated (clockwise as oriented in the figures) about an axis such that the powdered resin moves across a powder box side of the grate 16 from a first end 42 to a second end 44 (labeled only in FIG. 2C) so that powdered resin passes through one or more openings 36 adjacent the first end 42 before passing through one or more openings 36 adjacent the second end 44. The molding tool 10 can be further rotated so that it is inverted, then further rotated to be returned to its starting orientation. Rotation of the molding tool can be in any direction and can include more than one rotation.

As shown in the progressive FIGS. 2A-2D, the flow restrictor 16 has the effect of restricting the free flow of powdered resin from the powder box 14 to mold surface 26 during rotation of the molding tool 10. For example, if flow restrictor 16 was omitted, all of the powdered resin from powder box 14 would be quickly "dumped" onto mold surface 26 during rotation of the tool. Flow restrictor 16 restricts the flow of the powdered resin, allowing the resin to be more gradually and evenly distributed over the mold surface 26 during rotation of the molding tool. In embodiments in which the flow restrictor includes a grate, the powdered resin is also "conditioned" as it first contacts then flows through openings in the grate. In other words, any clumps of resin that may sometimes be formed in the bulk powdered resin due to moisture, temperature variations, static build-up, etc. can be sifted by the grate such that the clumps are either broken up into small enough pieces to pass through openings in the grate or prevented from reaching the mold surface 26, thereby preventing localized regions of excess material on the mold surface that could cause unwanted variations in final skin thickness.

As powdered resin is deposited onto mold surface 26 during rotation of the molding tool, the resin that comes into contact with the mold surface melts to form a molten layer of resin over the mold surface 26. The adhesive properties of the molten resin allow the molten layer to remain on the mold surface as the molding tool continues through a complete rotation to return to its starting orientation, while excess unmelted powdered resin returns to the powder box 14 through openings in the grate 16. When a sufficient amount of powdered resin has been deposited to form the desired molten layer thickness, the molten layer can be solidified by cooling or by cross-linking or curing of the resin. Cooling may be performed by flowing a cooling fluid through one or more temperature control lines 22 to cool mold surface 26. Cooling can either solidify the molten layer of resin to transform it into a skin that can be removed from the mold surface after mold 12 and powder box 14 are separated, or it can simply cool an already solidified layer of resin so that it can be removed from the mold surface. Of course, the molten layer or solidified layer can be cooled using other methods such as direct forced air cooling of the molten layer or other methods.

The method steps outlined above do not necessarily have to be performed in the order presented. For example, the powder box 14 can be separated from the mold 12 any time after a molten layer of sufficient thickness has been formed on mold surface 26. Heating of the mold surface 26 can continue even after the separation, for example to cure the resin. In some cases, such as cases where curing or cross-linking of the resin occurs with additional heating, the skin is formed prior to any cooling of the mold surface. As another example, the mold surface 26 may be heated after mold 12 and powder box 14 are connected together. In some embodiments, additional molding tool rotation steps can be included after the powder box 14 and mold 12 are separated to use gravity to more evenly distribute the molten layer of resin on the mold surface 26 during heating or cooling. Successive rotations can be performed in opposite directions as well. Additionally, the use of a flow restrictor 16, such as a grate, to restrict the free flow of powdered resin can allow some non-traditional powder molding techniques. For example, a flow restrictor such as one described herein could be placed above a heated mold surface, and a sufficient amount of powdered resin could be moved across the top side of the flow restrictor, such as in a wiping motion, so that powdered resin is deposited onto the mold surface through openings in the flow restrictor in an evenly distributed manner.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:
1. A powder slush molding tool, comprising:
a mold having a mold surface;

a powder box having an open end that permits flow of powdered resin from the powder box to the mold surface when the powder box and mold are connected together and rotated away from a starting orientation, wherein the open end of the powder box is facing in an upward direction and the mold surface is above and facing the powder box in a downward direction in the starting orientation; and a grate having opposite first and second ends and a plurality of openings through which the powdered resin can flow, wherein the grate extends at least partially across the open end from the first end to the second end, the first end being located at an outer periphery circumscribing the open end of the powder box, and the second end being located above the first end in the starting orientation, whereby the grate restricts flow of powdered resin through the open end.

2. The powder slush molding tool of claim 1, wherein the grate is attached to the powder box.

3. The powder slush molding tool of claim 1, wherein margins of at least a portion of the grate have substantially the same contour as at least a portion of the outer periphery of the powder box.

4. The powder slush molding tool of claim 1, wherein the open end includes a chute that extends toward the mold when the powder box and mold are connected together.

5. The powder slush molding tool of claim 4, wherein the grate is disposed within the chute.

6. The powder slush molding tool of claim 1, wherein the plurality of openings comprises a plurality of apertures arranged in a pattern in at least a portion of the grate.

7. The powder slush molding tool of claim 6, wherein the portion of the grate containing the pattern of apertures has an openness percentage in a range from about 30% to about 65%.

8. The powder slush molding tool of claim 6, wherein the width of at least some of the apertures ranges from about 5 to about 15 millimeters.

9. The powder slush molding tool of claim 1, wherein at least one of the plurality of openings is a different size than another of the openings.

10. The powder slush molding tool of claim 1, wherein at least one of the plurality of openings is a cut-out and at least some of the other openings are apertures.

11. The powder slush molding tool of claim 1, wherein the plurality of openings comprises a plurality of apertures that are arranged in a pattern and that are all the same size.

12. The powder slush molding tool of claim 1, wherein the grate extends across substantially the entire open end.

13. The powder slush molding tool of claim 1, wherein the grate is generally planar in contour.

14. The powder slush molding tool of claim 1, wherein the grate has opposite faces that are generally smooth.

15. The powder slush molding tool of claim 1, wherein at least one of the plurality of openings is a different shape than another of the openings.

16. The powder slush molding tool of claim 1, wherein the plurality of openings are arranged in at least two patterns.

* * * * *